United States Patent [19]

Dirck

[11] Patent Number: 5,454,596
[45] Date of Patent: Oct. 3, 1995

[54] SAFETY RESTRAINT APPARATUS

[76] Inventor: Ronald L. Dirck, 152 S. Zimmer Rd., Warsaw, Ind. 46580

[21] Appl. No.: 48,374

[22] Filed: Apr. 15, 1993

[51] Int. Cl.[6] .................................................. B60R 21/02
[52] U.S. Cl. .......................... 280/748; 104/241; 297/487
[58] Field of Search ...................... 280/748, 751, 280/753; 297/488, 487; 104/241; 105/329.1; 244/122 R

[56] References Cited

U.S. PATENT DOCUMENTS

| | | | |
|---|---|---|---|
| 1,440,586 | 1/1923 | Feucht | 104/241 |
| 1,597,491 | 8/1926 | Traver | 104/241 |
| 1,659,108 | 2/1928 | Illions | 104/241 |
| 3,453,026 | 7/1969 | Paes et al. | 297/487 |
| 3,494,633 | 2/1970 | Malloy | 297/487 |
| 4,930,808 | 6/1990 | Mikoll et al. | 280/731 |

*Primary Examiner*—Karin L. Tyson
*Attorney, Agent, or Firm*—Baker & Daniels

[57] ABSTRACT

A body safety restraint apparatus used in a prisoner transportation vehicle for restraining and bracing prisoners against impact and movement within the transportation vehicle. The restraint apparatus includes a pivotal restraint frame and a locking mechanism. The restraint frame pivots between an entry position for allowing prisoners to enter the vehicle and a restraint position overlying the prisoners while in a seated position. The restraint frame includes a horizontal bar extending across the prisoners' upper bodies and a horizontal restraint extending across the prisoners' laps.

12 Claims, 3 Drawing Sheets

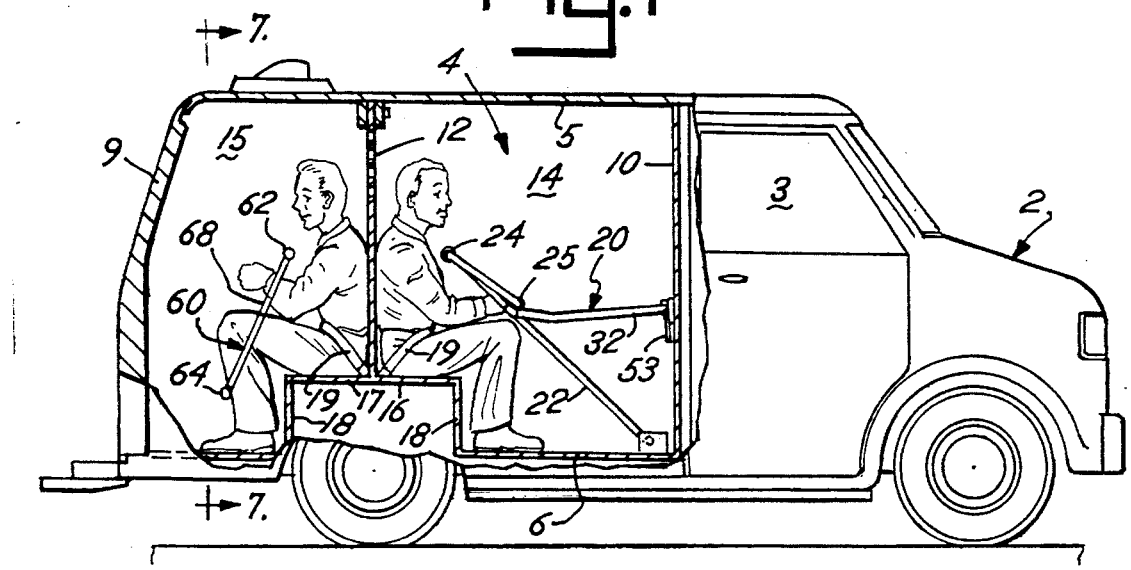
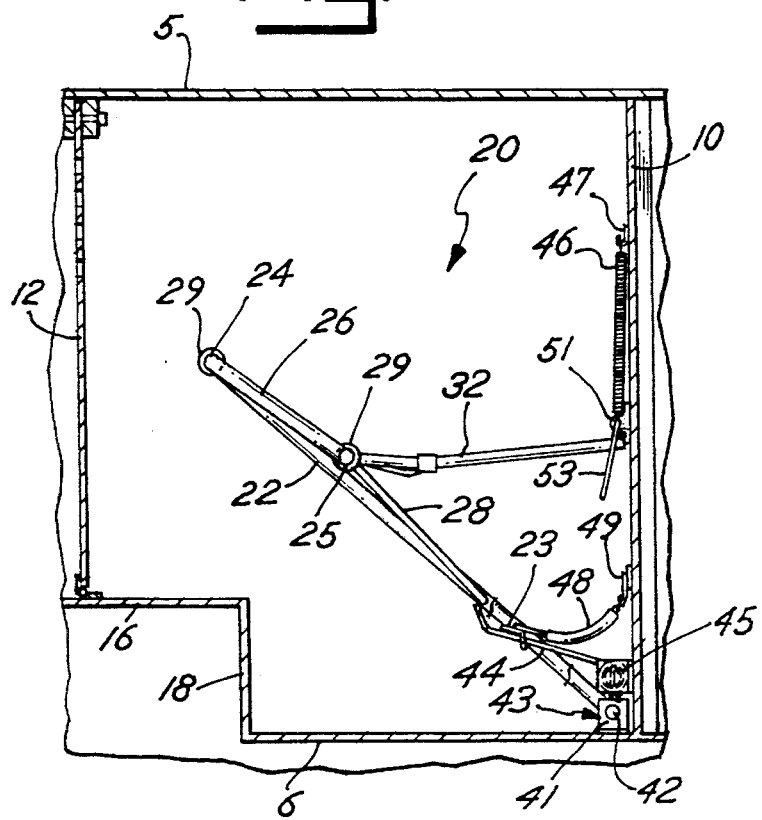
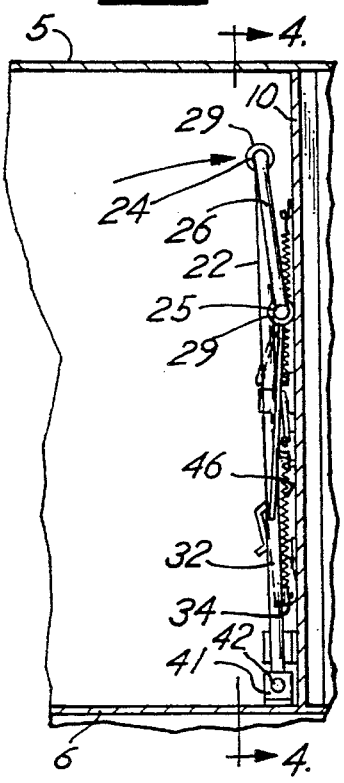

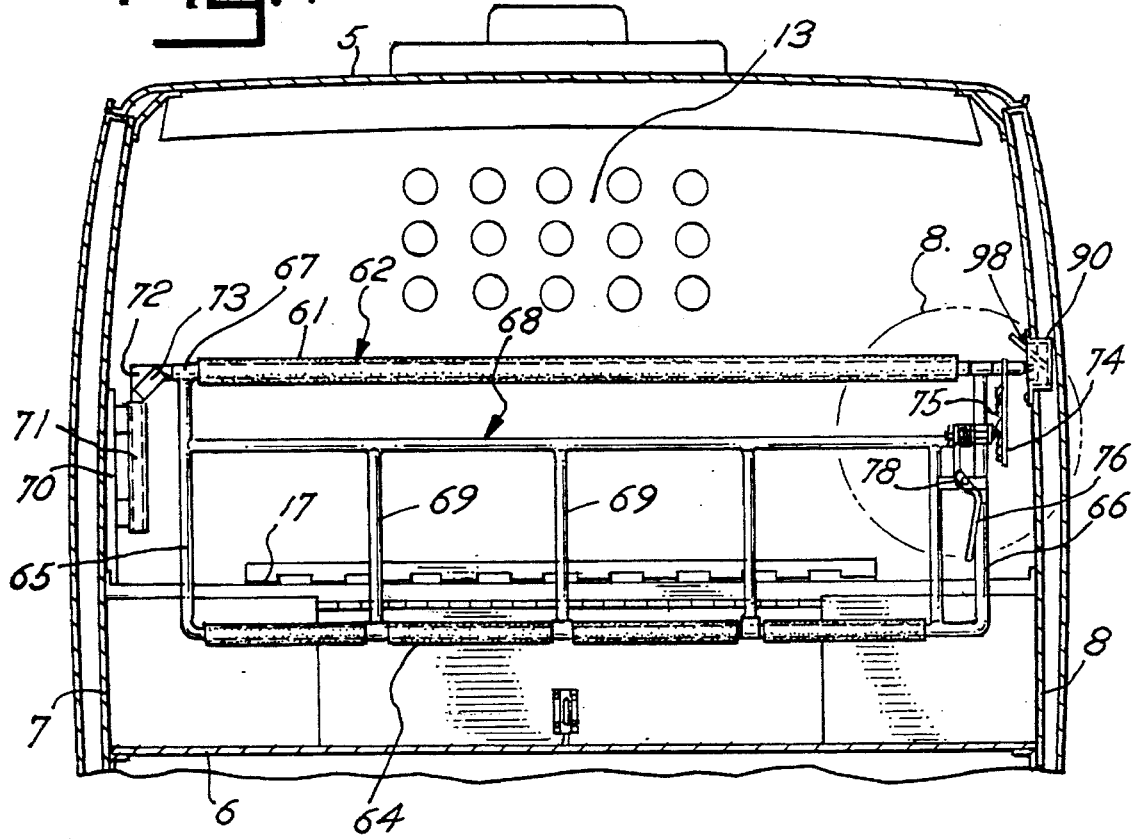
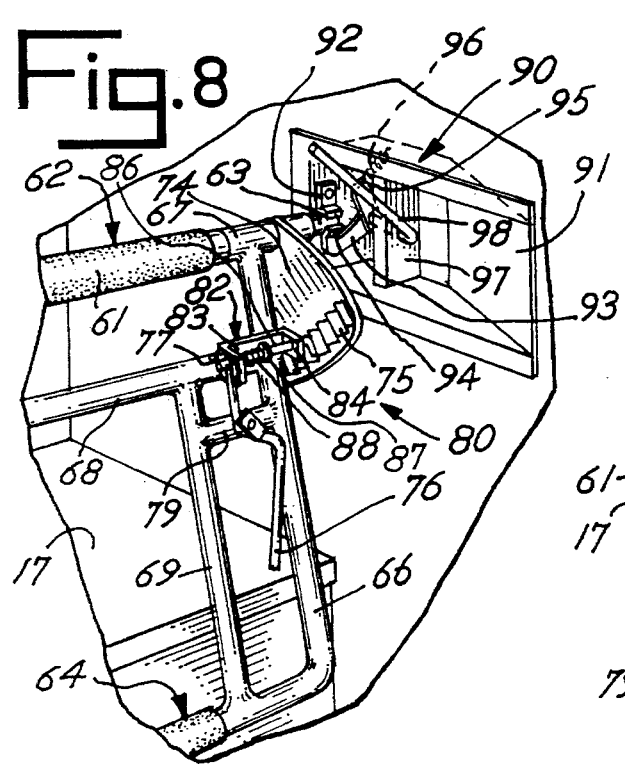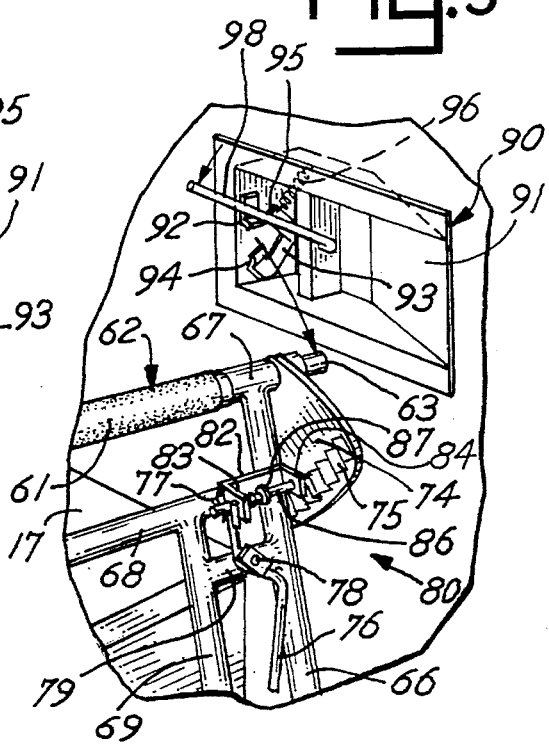

5,454,596

SAFETY RESTRAINT APPARATUS

This invention relates to a safety restraint apparatus for use in a vehicle, and in particular for use in prisoner transportation vehicles.

BACKGROUND OF THE INVENTION

Generally, prisoners wear individual security restraints during transportation between various locations, such as prisons, work sites and courthouses. The conventional safety restraints such as lap and shoulder belts provide limited individual protection of bound prisoners during collisions; however, individual security restraints, such as hand-cuffs and leg-irons, prevent the prisoner from using his arms and hands to brace himself during sudden starts, stops, sharp turns and collisions, thus increasing the probability of injury. Often security restraints are fastened to permanent fixtures within the vehicle to prevent the prisoner from moving about within the vehicle. Consequently, each prisoner must be individually released from both the safety and security restraints by correction personnel before exiting the vehicle in the event of an emergency.

SUMMARY OF THE INVENTION

The safety restraint apparatus of this invention eliminates both security and safety problems of the conventional restraint apparatus. The safety restraint apparatus of this invention uses a padded frame to overlie the prisoners' upper and lower bodies not only to brace the prisoners against impact but also to prevent the prisoner from voluntarily moving about within the vehicle.

The safety restraint apparatus includes padded upper and lower restraint bars, which are pivotally connected within the vehicle. With the prisoners seated in a row on a bench inside the vehicle, the frame pivots from an entry position into a restraint position. In the restraint position, a padded upper restraint bar extends across the prisoners' chest and the padded lower restraint bar extends across the prisoners' lap. The frame locks into position and prevents the prisoners from standing or moving about within the vehicle. During a collision, the frame acts as a safety restraint to prevent the prisoner from being tossed about in the vehicle. The frame can be quickly pivoted between the restraint and entry positions to allow ready access to and from the interior of the vehicle.

An object of this invention is to provide an active safety restraint system for prisoners wearing hand and leg restraints.

Another object is to provide an active safety restraint system that prevents prisoners from freely moving within a vehicle.

Other objects will become apparent upon a reading of the following description.

BRIEF DESCRIPTION OF THE DRAWINGS

A preferred embodiment of the invention has been depicted for illustrative purposes only wherein:

FIG. 1 is a side view of a vehicle with a portion cut away to show the safety restraint apparatus of this invention.

FIG. 2 is an enlarged side view of the front portion of the safety restraint apparatus of FIG. 1.

FIG. 3 is an enlarged side view of the front portion of the safety restraint apparatus in the unlocked position.

FIG. 7 is a rear elevational view of the rear portion of the safety restraint apparatus.

FIG. 8 is a partial view of the locking mechanism of the rear portion of the safety restraint apparatus.

FIG. 9 is a view similar to FIG. 8 except that the locking mechanism is unlocked.

DESCRIPTION OF THE PREFERRED EMBODIMENT

Figure 4:
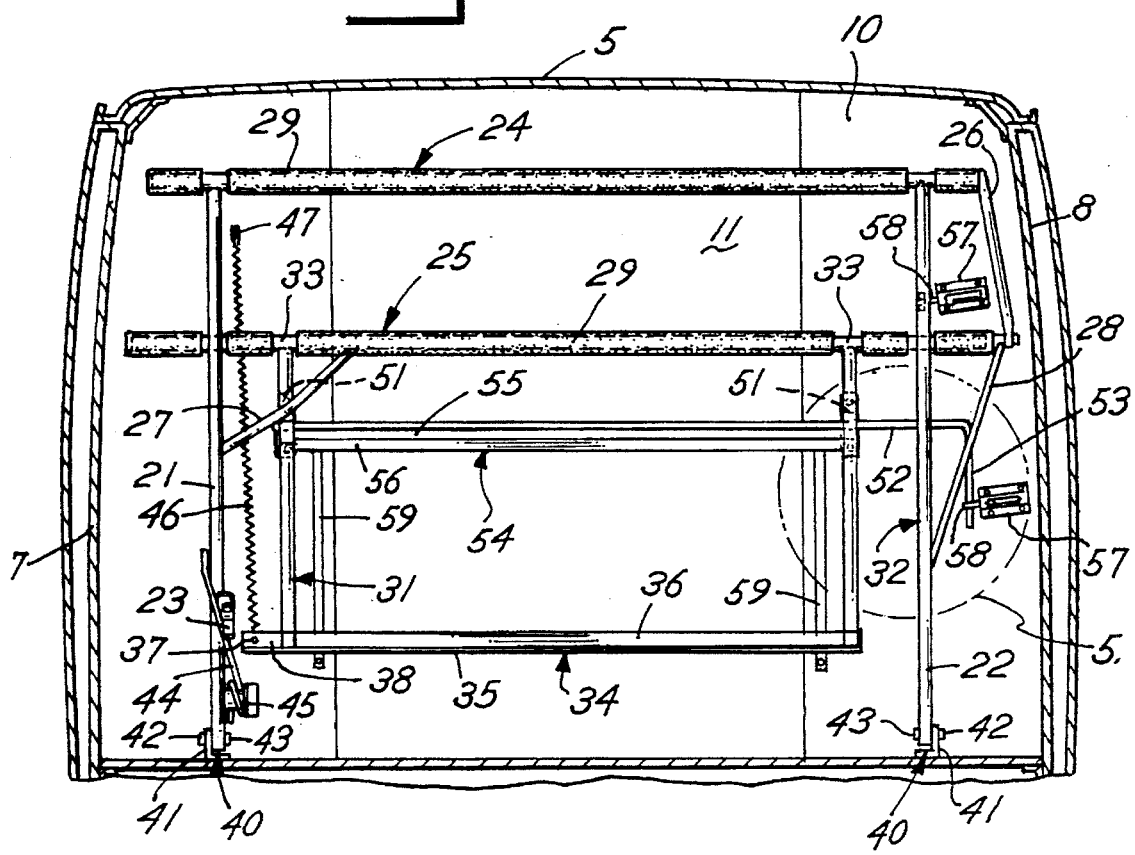
FIG. 4 is a front elevational view of the front portion of the safety restraint apparatus taken along lines 4—4 of FIG. 3.

The preferred embodiment herein described is not intended to be exhaustive or to limit the invention to the precise form disclosed herein. It is chosen and described to explain the principles of the invention and its application and practical use to enable others skilled in the art to utilize its teachings.

FIG. 1 shows the front and rear restraint frames of the prisoner safety restraint apparatus of this invention used in a conventional motor vehicle 2. Both restraint frames can be used in any application in any type of transportation vehicle. The safety restraint apparatus of this invention is not limited to any particular embodiment or application.

As shown in FIG. 1, vehicle 2 includes a rear cargo area 4 located behind the forward cabin 3, and defined by a ceiling 5, a floor 6, two side walls 7, 8, and rear and front walls 9, 10. Cargo area 4 is divided by a partition wall 12 into front and rear sections 14, 15. The cargo doors (not shown) in side wall 8 allow access to the front section 14. Rear cargo doors (not shown) in rear wall 9 allow access to the rear section 15. Front wall 10 has an opening 11 for accessing the cargo area 4 from the forward cabin 3. Partition wall 12 has a plurality of vent holes 13 to maintain air circulation to rear section 15. Two benches 16, 17 extend from either side of partition wall 12. Benches 16, 17 each have a front kick plate 18, which extends from the forward edges of both benches 16, 17 to floor 9. Benches 16, 17 also include a set of conventional safety restraint belts 19.

FIGS. 2–4 show front restraint frame 20. Front restraint frame 20 includes two spaced pivotal support legs 21, 22 connected by an upper restraint bar 24 and a lower restraint bar 25. Upper restraint bar 24 is horizontally secured to legs 21, 22 by welds. Lower restraint bar 25 is horizontally secured by welds at an intermediate point on the forward side of each leg 21, 22. Both upper restraint bar 24 and lower restraint bar 25 extend substantially the width of cargo area 4 with their end portions extending beyond the connection with legs 21, 22. An end cross bar 26 connects upper and lower restraint bars 24, 25 at the end adjacent to side wall 8. Support braces 27, 28 connect between lower restraint bar 25 and legs 21, 22 respectively. Restraint bars 24, 25 are covered by pads 29. Pads 29 are made from any soft material suitable for preventing injuries to the prisoners, such as foam rubber.

Legs 21, 22 are pivotally connected to a pair of floor hinges 40. Floor hinges 40 are secured to floor 6 of van 2 by welds or bolts. Each hinge 40 includes an upwardly extending arm 41. Each leg 21, 22 is pivotally connected to hinges 40 by a bolt 42, which extends through aligned bores in legs 21, 22 and arm 41 and an affixed nut 43. Front restraint frame 20 pivots forward and backward about bolt 42 between an entry position, wherein frame 20 abuts against front wall 10 and a restraint position, wherein frame 20 extends diagonally over bench 16. The rearward rotation of forward restraint 20 is limited by chain 48. One end of chain 48 is secured to a hook 49 mounted to front wall 10. The other end of chain 48 is connected to a hook 23 carried by leg 41. As shown in FIG. 3, front restraint frame 20 is biased against front wall 10 by a coil spring 44. Coil spring 44 is carried by coil bracket 45 mounted to front wall 10. One end of coil spring 44 abuts against front wall 10 beneath coil bracket 45. The other end of coil spring 44 engages hook 23 of leg 21.

Figure 5:
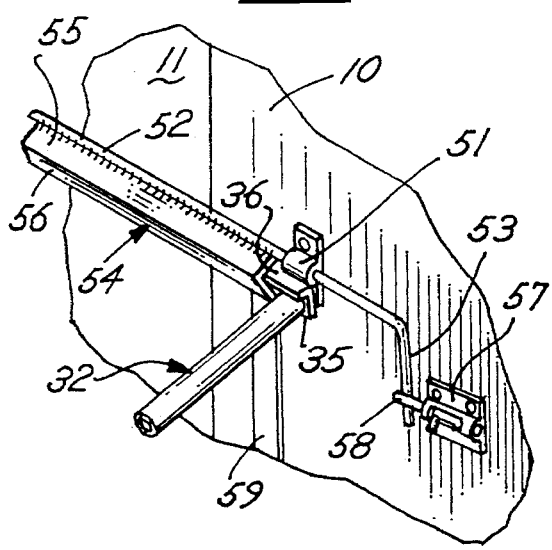
FIG. 5 is a partial view of the locking mechanism of the front portion of the safety restraint apparatus.
Figure 6:
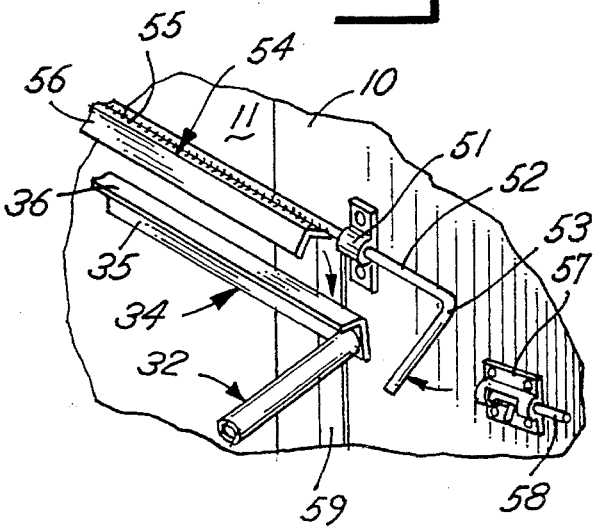
FIG. 6 is similar to FIG. 5 except that the locking mechanism is unlocked.

Two spaced extension arms 31, 32 are pivotally hung from lower restraint bar 25. The upper end of each arm 31, 32 includes a pivot sleeve 33. Lower restraint arm 25 journals in sleeves 33 to allow arms 31, 32 to pivot vertically about horizontal lower restraint arm 25. The lower ends of extension arms 31 and 32 are connected to a L-shaped latch bar 34. Latch bar 34 includes two sides 35, 36. As shown in FIGS. 4–6, latch bar side 35 is connected to the ends of arms 31, 32 and latch bar side 36 abuts along the front side of arms 31, 32. Latch bar 34 extends between arms 31, 32. Latch bar 34 includes an extension end 38, which extends beyond arm 31. Extension end 38 has a bore 37. Front wall 10 carries a spring hook 47. A helical spring 46 is connected at one end to spring hook 47 and at the other end to bore 37 in extension end 38. As shown in FIGS. 4–6, a pair of skid strips 59 are mounted vertically along front wall 10 on either side of opening 11.

Front restraint frame 20 includes a lock mechanism 50 carried on front wall 10. Lock mechanism 50 includes two spaced pillow blocks 51, which are mounted to front wall 10 on either side of opening 11 by screws. An elongated rod 52 extends horizontally through pillow blocks 51. Rod 52 has a bent end portion or handle 53. A L-shaped clasp bar 54 is welded longitudinally along rod 52. Clasp bar 54 includes two legs 55, 56. As shown in FIGS. 5 and 6, clasp bar 54 is welded to rod 52 along clasp bar side 55, such that the open face of clasp bar 54 pivots toward wall 10. Movement of handle 53 rotates rod 52 and clasp bar 54 between a locked position shown in FIG. 5 and an unlocked position in FIG. 6. Two sets of slide latches 57 are mounted to side wall 10 for securing handle 53 in either an upper or down position, whereby lock mechanism 50 is held in its locked or unlocked positions. Each slide latches 57 includes a slide bolt 58, which extends to hold handle 53 against wall 10.

As shown in FIGS. 5 and 6, latch bar 34 of extension arms 31, 32 is positioned directly below clasp bar 54 with latch bar side 35 abutting adjacent front wall 10 and latch bar side 36 extending outwardly and positioned over extension arms 31, 32. FIG. 5 shows clasp bar 54 rotated over latch bar 34 in the locked position. In the locked position, handle 53 is rotated downwardly against wall 10. Clasp bar side 56 extends under the outwardly extending latch bar side 36, which prevents arms 31, 32 from shifting downward to the entry position under tension by coil spring 44. Slide bolt 58 extends to hold handle 53 against wall 10, which prevents the lock mechanism from inadvertently unlocking. FIG. 6 shows clasp bar 54 rotated away from latch bar 34 in an unlocked position. In the unlocked position, handle 53 is rotated upwardly to pivot clasp bar side 56 away form latch bar side 35, thereby releasing latch bar 34 and extension arms 31, 32.

FIGS. 1 and 2 show front restraint frame 20 in the restraint position. The prisoners are seated on bench 16 facing front wall 10. Front restraint 20 can be used with one or more prisoners depending on the width of bench 16. The prisoners can be strapped to bench 16 with seat belts 19 for additional safety. In the restraint position, upper restraint bar 24 extends across the front of the prisoners' upper body and lower restraint bar 25 extends across the prisoners' lap. During collisions or sudden shifts in the vehicle, the padded restraint bars 24, 25 protect the prisoners from injuries and from being tossed about within the vehicle. In addition to protecting the prisoners from injury, restraint bars 24, 25 prevent the prisoners from freeing themselves during transport. Lower restraint bar 24 prevents the prisoners from rising from their seated positions on bench 16. Upper restraint bar 24 prevents the prisoners from reaching lock mechanism 50 mounted to front wall 10.

FIG. 3 shows front restraint frame 20 in its entry position spaced from bench 16 to provide room for prisoners to enter and exit front section 14 through the side cargo doors. In the entry position, front restraint frame 20 abuts against front wall 10 with arms 31, 32 and latch bar 34 folded against legs 21, 22. The tension of coil spring 44 holds front restraint frame 20 against wall 10. Front restraint frame 20 is shifted between the restraint and entry position by pushing and pulling upper horizontal bar 24 toward and away from wall 10. As frame 20 moves forward toward wall 10, arms 31, 32 and angle bar 34 slide downwardly along skid strips 50. The tension of spring 46 holds latch bar 34 against skid strips 50.

FIGS. 1 and 7–9 show the rear restraint frame 60. Rear restraint frame 60 includes a horizontal upper restraint bar 62 and a U-shaped lower restraint bar 64. Lower restraint bar 64 includes two spaced legs 65, 66. A cross restraint bar 68 extends between legs 65, 66. The upper end of each leg 65, 66 includes a pivot sleeve 67. Upper restraint bar 62 extends through pivot sleeves 67 to allow lower restraint bar 64 to swing vertically about upper restraint bar 62. Rear restraint frame 60 also includes three divider bars 69 connected between lower bar 64 and cross restraint bar 68. Upper and lower restraint bars 62, 64 are covered by pads 61. Pads 61 are made from any soft material suitable for preventing injuries to the prisoners, such as foam rubber. Upper restraint bar 62 includes a head tube 72 that extends perpendicularly downwardly from one end of upper restraint bar 62. Upper restraint bar 62 includes a locking end 63. Head tube 72 is reinforced by a gusset 73 that is welded between upper restraint bar 62 and head tube 72. As shown in FIG. 7, upper restraint bar 62 is pivotally mounted to side wall 7 in the rear section 15. A mounting plate 70 is connected to side wall 7 at an intermediate height between ceiling 5 and floor 6. Mounting plate 70 includes a vertically oriented hinge sleeve 71. Head tube 72 is journaled within hinge sleeve 71 to allow radial movement of upper restraint bar 62 in a horizontal plane between an entry position and a restraint position positioned.

In the entry position, rear restraint frame 60 is spaced away from bench 17 to allow prisoners to enter and exit rear section 15 through the rear cargo doors. The prisoners are seated on bench 17 facing rear wall 9. Front restraint 20 can be used with one or more prisoners depending on the width of bench 16. As shown in FIG. 7, rear restraint frame 60 can accommodate four prisoners. With the prisoners seated in a row along bench 17 and strapped into seat belts 19, rear restraint frame 60 is pivoted to the restraint position.

FIGS. 1 and 7 show rear restraint frame 60 in the restraint position. In the restraint position, each prisoner is seated so that both legs are positioned in the spaces between the dividers 69 or dividers 69 and legs 65, 66. During transportation, dividers 69 help brace the prisoners against lateral shifts in vehicle 2. In the restraint position, upper restraint bar 62 extends across the prisoners' upper bodies, lower restraint bar 64 extends across the prisoners' shins, and cross bar 68 overlies the prisoners' lap. The location of restraint bars 62, 62 and cross bar 68 prevent the prisoners from being tossed about within rear section 15 during transportation. During collisions or sudden shifts in the vehicle, the padded restraint and cross bars protect the prisoners from injuries and from being tossed about within the vehicle. As shown in FIG. 1, the prisoners' arms extend between upper restraint bar 62 and cross bar 68, to prevent the prisoners from raising their arms or accessing the lock mechanism 90. Cross restraint bar 68 prevents the prisoners from moving out of the seated position. Lower restraint bar 64 prevents the prisoners from kicking the rear cargo doors. Upper restraint bar 62 prevents the prisoners from leaning forward.

FIGS. 8 and 9 show the locking mechanism 90 for securing upper restraint bar 62 in the restraint position. Side wall 8 supports locking mechanism 90 at a height approximately across from mounting plate 70. Lock mechanism 90 includes a housing 91 recessed within side wall 8. Housing 91 carries an upper fixed bracket 92 and a pivotal clasp plate 93. Clasp plate 93 includes a contact part 94 and a bias arm 95. A helical spring 96 is connected between bias arm 95 and the back of housing 91. Housing 91 includes a partition 97. Clasp plate 93 is connected to a handle 98. As shown in FIG. 8, rear restraint frame 60 is locked in the restraint position by lock mechanism 90. Spring 96 pulls locking plate 93 upward to restrictively engage lock end 63 of upper restraint bar 62 between bracket 92 and contact part 94. As shown in FIG. 9, pulling handle 98 downward pivots clasp plate 93 against the resistance of spring 96 away from bracket 92 to release lock end 63. In the release position, rear restraint frame 60 can be pivoted away from lock mechanism 90 back to the entry position.

As shown in FIGS. 8 and 9, rear restraint frame 60 carries an adjustment mechanism 80. Adjustment mechanism 80 includes a rachet plate 74 welded to upper restraint bar 62 near lock end 63. Rachet plate 74 includes an arcuate row of raised notches 75. A U-shaped bracket 82 is mounted to cross restraint bar 68 adjacent rachet plate 74. Bracket 82 includes two out turned arms 83, 84. An elongated latch bolt 86 extends through aligned bores in arms 83, 84 to engage rachet plate 74 along notches 75. A raised annular ring 87 extends about a mid point of latch bolt 86. A helical spring 88 positioned concentrically about latch bolt 86 between arm 83 and annular ring 87 biases the contact end of latch bolt 86 toward rachet plate 74. The opposite end of latch bolt 86 is connected to a lever 76. Latch bolt 86 is secured to lever 76 by cotter key 77. Lever 76 hangs from latch bolt 86 to rest against a pintle 78, which extends from a cross support 79 connected between leg 65 and the right most divider bar 69. Pintle 78 acts as a fulcrum for levering latch bolt 86 away from rachet plate 74 against the resistance of spring 88. With rear restraint frame 60 locked in the restraint position, the attitude of lower restraint bar 64 can be adjusted, such that lower restraint bar 64 descends toward the prisoners to contact the prisoners' shins. Depressing handle 76 toward wall 8 pulls latch bolt 86 out of engagement with notches 75, whereby lower restraint bar 64 is freed to pivot downward towards bench 17. With handle 76 released, spring 83 urges latch bolt 86 against notches 75, which locks lower restraint bar 64 at the proper attitude.

It is understood that the above description does not limit the invention to the details given, but may be modified within the scope of the following claims.

I claim:

1. A vehicle comprising:

a compartment including a plurality of vertical walls and a bench, one of said walls spaced apart from and in front of said bench;

a frame, said frame including a first and second spaced apart frame parts, said first frame part extending across the upper body of a prisoner when said prisoner is seated upon said bench and said frame is in said restraint position, said second frame part extending across the lower body of said prisoner when said prisoner is seated upon said bench when said frame is in said restraint position, said frame further including an arm with two ends, one end of said arm being pivotally connected to said second frame part wherein said arm is pivotal about a horizontal axis and the other end of said arm extends towards said one wall, said arm being shiftable between an up position when said frame is in said restraint position and a down position when said frame is in said entry position;

means for pivotally mounting said frame to said one wall, said pivotally mounting means located between said bench and said one wall for pivoting movement toward and away from said bench between a restraint position wherein said frame overlies a said prisoner when a said prisoner is seated upon said bench and an entry position wherein said frame is spaced from a said prisoner when a said prisoner is seated upon said bench with said frame being pivotal about a horizontal axis;

locking means for locking said frame in said restraint position, said locking means mounted to said one wall for interlocking engagement with said frame, said locking means being shiftable between a locked position wherein said frame is interlocked within said locking means and an unlocked position wherein said frame is spaced away from said locking means, wherein said other arm end is located adjacent said locking means when said frame is in said restraint position and said other arm end is spaced away from said locking means when said frame is in said entry position;

wherein said frame maintains a said prisoner in a seated position on said bench when said frame is in said restraint position.

2. The vehicle of claim 1 wherein said other arm end includes an elongated latch part, said locking means includes an elongated locking part pivotally mounted to said wall, said locked position is defined by said locking part being located over said latch part when said arm is in said up position, and said unlocked position is defined by said locking part being located away from said latch part when said arm is in said up position.

3. The vehicle of claim 1 further comprising spring biasing means connected between said other arm end and said one wall for biasing said other arm end toward said locking means.

4. The vehicle of claim 1 wherein said compartment includes two spaced side walls, said bench is located between said side walls, and said pivotally mounting means has a first portion mounted to one of said side walls and a second portion mounted to said frame wherein said frame pivots about a substantially horizontal axis between said restraint position and said entry position.

5. The vehicle of claim 4 wherein said locking means is pivotally mounted between said first frame part and the other of said side walls, and said locked position is defined by said locking means being interlocked with said first frame part when said frame is in said restraint position and said unlocked position is defined by said first frame part being spaced away from said locking means when said frame is in said restraint position.

6. The vehicle of claim 5 wherein said first frame part includes a lock end, said locking means includes a lock part pivotally mounted to the other of said side walls, said lock part is shiftable between an engaged position wherein said lock part is interlocked with said frame lock end when said frame is in said restraint position and a disengaged position wherein said frame end is spaced away from said lock part when said frame is in said restraint position.

7. The vehicle of claim 6 wherein said locking means also includes spring means connected to said lock part for biasing said lock part against said frame lock end when said lock part is in engaged said position and said frame is in said restraint position.

8. The vehicle of claim 1 wherein said second frame part is pivotally connected to said first frame part for movement about a horizontal axis, and said second frame part is shiftable between a raised position wherein said second frame part is spaced away from the lower body of a said prisoner when a said prisoner is seated upon said bench and said frame is in said restraint position, and a lowered position wherein said second frame part extends across the lower body of a said prisoner when a said prisoner is seated upon said bench and said frame is in said restraint position.

9. The vehicle of claim 8 wherein said frame also includes adjustment means for selectively positioning said second frame part relative to said first frame part between said raised and lowered positions.

10. The vehicle of claim 9 wherein said adjustment means includes a plate fixed to said first frame part, an extensible slide bolt shiftably carried by said second frame part, spring means operatively associated with said slide bolt for urging said slide bolt into interlocking engagement with said plate, handle means connected to said slide bolt for shifting said slide bolt away from said plate, said plate includes a row of notches, and said slide bolt engages said notches when said bolt is in interlocking engagement with said plate.

11. The vehicle of claim 8 wherein said frame also includes divider means connected to said second frame part for extending on each side of a said prisoner when a said prisoner is seated upon said bench, and when said frame is in said restraint position to prevent lateral movement of a said prisoner along said bench.

12. The vehicle of claim 11 wherein said second frame part includes two spaced legs and said frame further includes a third horizontal frame part connected between said legs, said legs being pivotally connected to said first frame part, said second frame part extending across the shin of a said prisoner when a said prisoner is seated upon said bench and said frame is in said restraint position, said third frame part extending across the thigh of a said prisoner when a said prisoner is seated upon said bench and said frame is in said restraint position, and said divider means includes said legs.

* * * * *